US00RE34604E

United States Patent [19]

Shaw

[11] E Patent Number: Re. 34,604

[45] Reissued Date of Patent: May 10, 1994

[54] SENSOR USING FIBER INTERFEROMETER

[75] Inventor: Herbert J. Shaw, Stanford, Calif.

[73] Assignee: Stanford University, Stanford, Calif.

[21] Appl. No.: 589,061

[22] Filed: Sep. 26, 1990

Related U.S. Patent Documents

Reissue of:

[64] Patent No.: 4,773,758
Issued: Sep. 27, 1988
Appl. No.: 900,768
Filed: Aug. 27, 1986

U.S. Applications:

[60] Division of Ser. No. 564,998, Dec. 13, 1983, Pat. No. 4,634,852, which is a continuation-in-part of Ser. No. 368,422, Apr. 14, 1982, abandoned.

[51] Int. Cl.[5] ..... G01B 9/02
[52] U.S. Cl. ..... 356/345; 250/227.27
[58] Field of Search ..... 356/345, 350; 250/227.19, 227.27

[56] References Cited

U.S. PATENT DOCUMENTS

| | | | |
|---|---|---|---|
| 4,162,397 | 7/1979 | Bucaro et al. . | |
| 4,299,490 | 11/1981 | Cahill et al. . | |
| 4,319,186 | 3/1982 | Kingsley . | |
| 4,319,829 | 3/1982 | Davis et al. . | |
| 4,323,310 | 4/1982 | Shaw et al. . | |
| 4,342,517 | 8/1982 | Johnson et al. . | |
| 4,375,680 | 3/1983 | Cahill et al. . | |
| 4,634,852 | 1/1987 | Shaw | 356/345 |
| 4,773,758 | 9/1988 | Shaw | 356/345 |

FOREIGN PATENT DOCUMENTS

| | | |
|---|---|---|
| 044572 | 1/1982 | European Pat. Off. . |
| 3039235 | 5/1982 | Fed. Rep. of Germany . |

OTHER PUBLICATIONS

Ulrich, "Fiber-optic rotation sensing with low drift", *Optics Letters*, vol. 5, No. 5, pp. 173-175, May 1980.

"Optical Fiber Sensor Development", Bucaro, et al., Physics of Fiber Optics, vol. 2, 1981, pp. 493-514.

"Optical Fiber Sensor Technology" Gialborenzi, et al., IEEE Transactions on Microwave Theory and Techniques, vol. MTT-30, No. 4, Apr. 1982, pp. 472-474, 477-483, 486-489.

"Fiber Resonator Gyroscope: Sensitivity and Thermal Nonreciprocity", D. M. Shupe, Applied Optics, vol. 20, No. 2, 1/15/81, pp. 286-289.

"All-Single-Mode Fiber-Optic Gyroscope with Long-Term Stability", Bergh, et al., Optics Letters, vol. 6, No. 10, Oct. 1981, pp. 502-504.

"Fiber-ring Interferometer: Polarization Analysis", Ulrich, et al., Optics Letters, vol. 4, No. 5, May 1979, pp. 152-154.

Rashleigh, "Magnetic-field sensing with a single-mode fiber", *Optics Letters*, vol. 6, No. 1, pp. 19-21, 1/81.

*Primary Examiner*—Samuel A. Turner
*Attorney, Agent, or Firm*—Knobbe, Martens, Olson & Bear

[57] ABSTRACT

A closed loop optical fiber interferometer is used in sensing a quantity, Q, by applying a time varying or modulated measure of, Q, asymmetrically to the closed loop (24) and detecting phase shift between two counterpropagating optical signals in the closed loop. The closed loop (24) can be used in the sensing element or a separate sensor (68, 70) can develop a time varying signal which is then applied to the closed loop interferometer.

26 Claims, 2 Drawing Sheets

SENSOR USING FIBER INTERFEROMETER

Matter enclosed in heavy brackets [ ] appears in the original patent but forms no part of this reissue specification; matter printed in italics indicates the additions made by reissue.

RELATED APPLICATION

This application is a division of application Ser. No. 564,998, filed as PCT US83/00534 on Apr. 13, 1983, published as WO83/03684 on Oct. 27, 1983, now U.S. Pat. No. 4,634,852, which is a continuation-in-part of U.S. patent application Ser. No. 368,422 filed Apr. 14, 1982, now abandoned.

BACKGROUND OF THE INVENTION

This invention relates generally to closed loop or "Sagnac" fiber optic interferometers, and, more particularly, the invention relates to sensors for environmental quantities which can affect fiber optic waveguides in fiber optic interferometers.

Interferometers work on the principal of phase change between two coherent signals which are interfered together. Closed loop interfometers measure the relative phase change on a "global" scale, i.e., they measure the overall relative phase change between two counterpropagating light signals in a single loop of fiber.

The optical fiber loops of interferometers are sensitive to a large number of environmental effects such as temperature, acoustic pressure, vibration, motion, and electric and magnetic fields. These external phenomena can change the optical transmission characteristics of the fiber such as by changing the birefringence in the fiber or the geometric path length or the velocity of propagation of light signals through the fiber, which can result in changes in the amplitude, phase, or polarization of light propagating therethrough. This sensitivity to environmental effects means that fiber interferometer loops may function as sensor elements so long as the desired quantity to be sensed can be isolated from the other environmental quantities to which the fiber is sensitive.

A distinction should be made in the reader's mind between environmental effects which are "reciprocal" (i.e., effects which do not cause a phase shift between the counterpropagating waves) and environmental effects which are "non-reciprocal" (i.e., those effects which do cause a phase shift between counterpropagating waves). Additionally, reciprocal and non-reciprocal effects may be thought of either as being on a "global scale", wherein the effect of the environmental phenomena is considered with respect to the loop as a whole, or as being on a "differential scale", wherein the phenomena is considered only with respect to a localized, ting segment of the fiber. Certain environmental effects such as rotation and the Faraday effect cause non-reciprocal effects on the differential scale in that they will cause a relative phase change between counterpropagating light signals travelling through the same tiny piece of fiber. These non-reciprocal differential effects are cumulative so that the resulting effect on a global scale is also nonreciprocal. Other environmental effects, such as pressure, are reciprocal on the differential scale in that they cause no net relative phase change between counterpropagating light signals travelling through the same tiny piece of fiber. On a global scale, the cumulative effect of these reciprocal differential effects is ordinarily also reciprocal. Such reciprocal effects on the differential scale, therefore, cannot be measured by a closed loop interferometer unless some way is devised to make these effects non-reciprocal on the global scale even though they are reciprocal on the differential scale.

In the prior art, the closed loop interferometer is typically used to sense mon-reciprocal differential effects, such as rotation. When operated with a polymer which limits the optical paths of the counterpropagating light to a single one of the polarization modes, as disclosed in copending U.S. patent application Ser. No. 319,311, filed Nov. 9, 1981 which is a continuation in part of U.S. patent application Ser. No. 307,095 filed on Sept. 30, 1981 which is a continuation in part of U.S. patent application Ser. No. 249,714 filed on Mar. 31, 1981, the closed loop interferometer is basically stable and, on a global scale, is relatively insensitive to environmental effects other than non-reciprocal, differential effects, such as motion. In such interferometers, any reciprocal, differential environmental phenomena, such as temperature or pressure, affects the fiber optical light transmission characteristics of both counterpropagating light signals substantially equally and, therefore, results in little or no relative phase change between the counterpropagating signals. The present invention teaches a closed loop interferometer configuration which senses differential reciprocal effects, such as acoustic pressure, by making their effect on the global scale non-reciprocal.

SUMMARY OF THE DISCLOSURE

The present invention is directed to use of the closed loop optical interferometer to sense environmental phenomena which normally produce reciprocal effects on an infinitesimal length of fiber by causing them to produce non-reciprocal effects. Briefly, this is accomplished by making the sensed phenomenon spatially asymetrical and non-uniform with respect to the closed loop. The fundamental principal which is utilized in the three basic embodiments disclosed herein is to cause the quantity Q to be sensed to be applied to the closed loop of the interferometer such that Q is time varying and is applied at a point that is offset from the center of the path around the loop, i.e., a rapidly time varying Q is applied at a point on the path such that one of the counterpropagating light signals has farther to travel to the detector than the other. As used herein, the term "counterpropagating waves" or the term "counterpropagating light signals" means collectively both of the light signals travelling in opposite directions in the loop of the interferometer. The term "counterpropagating wave" (or light signal) means only the light wave travelling in the loop in the direction opposite the direction of travel for the acoustic wave.

A special case of the fundamental principal of making the quantity to be sensed spatially asymmetrical and non-uniform with respect to its effect on the two counterpropagating light signals is disclosed in the first two embodiments disclosed because it is easier to grasp the basic principle by these two examples. These two embodiments are sensors for acoustic waves which utilize coils of fiber optic waveguide that are specially wound so that the effect of the acoustic wave is non-uniform on the two counterpropagating light waves. That is, the loop is wound and arranged with respect to the wave to be sensed such that the subject wave has a uniform effect on the copropagating light signal, i.e., the light signal traveling in the same direction as the subject wave, but has a non-uniform effect on the counter-propagating light signal. This is done in the first embodiment by winding the coil such that the axial velocity of the co-propagating light wave along the longitudinal axis of the coil matches the velocity of propagation of the acoustic wave along the longitudinal axis. In the second embodiment, the fundamental principle is utilized by winding two coils separated in spaced by ¼ of the wavelength of the acoustic wave with the size of the coil diameter and the number of turns selected such that the transit time for the light signals through each coil is ¼ of the period of the acoustic wave. The length of each coil is also selected such that the coil occupies a very small space compared to the wavelength of the acoustic wave such that the coil is affected substantially uniformly by the portion of the acoustic wave by which it is enveloped.

In the preferred embodiment, the quantity Q to be sensed is applied to the loop of the interferometer such that it is time varying and spatially asymmetrical. Because the quantity Q is applied asymmetrically to the loop, variations in Q will affect each of the counter-propagating waves differently thereby producing a phase difference therebetween. However, if Q is a slowly varying quantity such as temperature, the value of Q may not change appreciably between the arrival times of the two counterpropagating waves at the point on the loop where Q is applied, so that each wave is affected substantially the same by Q. In such a case, the quantity Q is modulated onto a bias or carrier frequency which is rapidly time varying by a conventional modulator and applied to the loop at a point which is offset from the geometric center of the path between the light source and the detector. In the preferred embodiment, the modulated Q, i.e., q(t), is applied to the loop with a phase modulator which stretches the fiber in proportion to the amplitude of q(t).

Importantly, the invention utilizes the inherent stability and quieter operations of the closed loop interferometer to sense reciprocal quantities by causing them to produce nonreciprocal effects. The result is a quieter, more sensitive sensor which is better able to distinguish the effects of the desired quantity to be sensed from the effects of undesired quantities.

The delay line function of the closed loop increases the activity to the quantity Q and allows a lower modulation frequency for the quantity Q when the invention is being used to sense slowly varying quantities such as temperature.

Accordingly, an object of the invention is a sensor which utilizes a closed loop fiber optic interferometer.

The invention and objects and features thereof will be more readily apparent from the following detailed description and appended claims when studied in light of the drawings.

DETAILED DESCRIPTION OF THE PREFERRED EMBODIMENT

Figure 1:
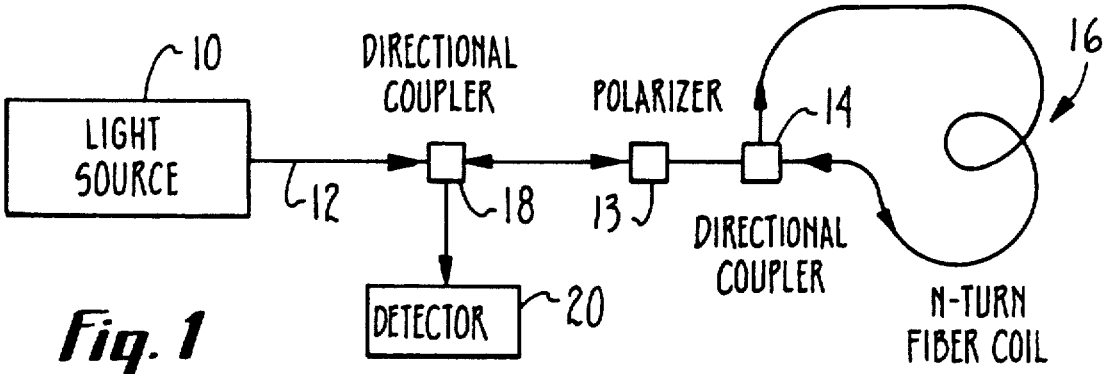
FIG. 1 is a schematic of a closed loop fiber optic interferometer such as is used in a rotation sensor.

Referring now to the drawings, FIG. 1 is a simplified schematic of a closed loop fiber optic interferometer such as is used in the rotation sensor disclosed in co-pending U.S. patent application Ser. No. 319,311, filed Nov. 9, 1981 which is a continuation in part of U.S. patent application Ser. No. 307,095 filed on Sept. 30, 1981 which is a continuation in part of U.S. patent application, Ser. No. 249,714 filed on Mar. 31, 1981 the details of all of said patent applications being hereby incorporated by reference. A light source 10 generates a beam of light which is transmitted through an optical fiber 12 and polarizer 13 to a fiber optic directional coupler 14. A directional coupler could also be used to perform the beam splitting function. The light beam is split into two waves which propagate through the closed loop 16 in opposite directions as indicated by the arrows. After propagating through the loop 16 the two beams are recombined and pass through the optical fiber 12 to the polarizer 13 and then to a second fiber optic directional coupler 18 which directs the combined signals to a detector 20. The detector responds to the intensity of the combined waves which depends on the differences in phase between the two counterpropagating waves and provides an output signal indicative of the phase shift. Since the rotation of the fiber coil has a nonreciprocal effect on the counterpropagating waves, the detector gives a measure of the rotation. While not shown in FIG. 1, the closed loop interferometer may also employ directional couplers, polarization controllers, phase modulators, and lock-in amplifiers as described in the co-pending application and as described by Bergh, Lefevre and Shaw in "All-single-mode fiber-optic Gyroscope with Long Term Stability", Optics Letters, Vol 6, No. 10, Oct. 1981 and in "All-Single - mode Fiber-Optic Gyroscope", Optics Letters, Vol. 6, No. 4, April 1981.

The interferometer can take the form of an all fiber integrated device in which all components are constructed in a single monomode fiber. The phase modulator, if used, can provide bias which increases sensitivity and linearity of response.

Examples of normally differentially reciprocal effects which do not strongly affect the interferometer of FIG. 1 are temperature, force, stress, pressure, displacement, strain, vibration and acoustic waves.

Figure 2:
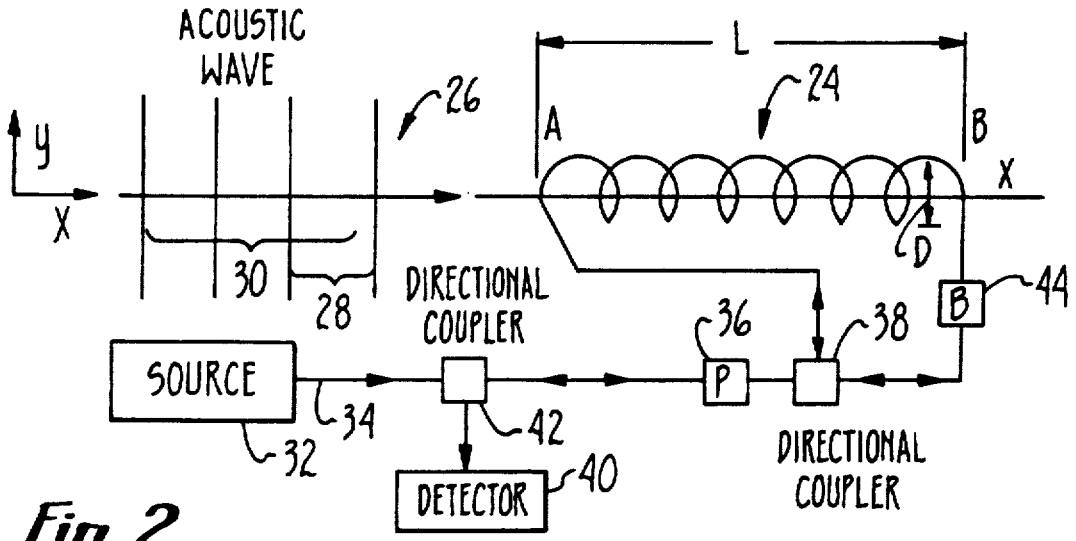
FIG. 2 is a schematic of an acoustic sensor employing a closed loop fiber optic interferometer in accordance with the embodiment of the invention.

FIG. 2 is a schematic of an acoustic wave sensor employing a closed loop interferometer in accordance with one embodiment of the invention. The acoustic wave sensor is similar in configuration to the rotation sensor of FIG. 1. However, in this embodiment, the coil 24 is wound in an extended helical pattern having a longitudinal axis "x" lying along the direction of travel of an acoustic wave 26 to be sensed.

The sensor comprises a closed loop fiber optic waveguide 24 which is coiled into a number of turns. The diameter, D, of the turns, the number of the turns, N, and the spacing of the turns along the longitudinal axis x are selected to meet certain criteria. That criteria is that the acoustic wave 26 to be sensed must travel down the longitudinal axis x of the coil at the same velocity as that of a co-propagating optical signal traveling in the coil 24 from the A end to the B end would have. That is, as the light wave travels around the turns in the coil, it works its way toward the B end at a certain axial rate as if the light wave were climbing up the threads of a very finely threaded screw. This axial velocity for the light wave is much slower than the actual velocity of propagation in the fiber because there are many turns and each is approximately parallel to the planes 28 of the acoustic wave. Acoustic waves have planes of acoustic compression and rarifaction which are orthogonal to the direction of propagation of the acoustic wave. The planes 28, for a sound wave, represent peaks of higher pressure medium in the acoustic wave, and the spaces 30 represent areas of lower pressure medium.

In the embodiment of FIG. 2, the coil is configured to maximize the overall global, non-reciprocal effect of the acoustic wave on the coil. The coil is configured with respect to the acoustic wave such that the effect of the acoustic wave on the coil is time varying and spatially non-uniform so as to cause a relative phase shift between the counterpropagating waves. The diameters of the coil and the number of turns are selected such that an optical wave travels the length of the coil 24 in a time $T_1$ which is equal to the time, $T_a$, for an acoustic wave to travel the axial length of helical coil 24. Accordingly, a wave propagating through the coil from left to right experiences a constant pressure from the acoustic wave, whereas an optical wave traveling from right to left experiences a continually varying effect.

That is, the number and or spacing of the turns in the coil 24 are selected such that as a light wave enters the A end of the fiber, its speed of travel down the x axis toward the B end matches the speed of propagation of the acoustic wave 26 along the x axis toward the B end. Thus, if a pulse or burst of light enters the A end of the coil 24 when the A end is enveloped by the higher pressure region of a wave peak 28 of the acoustic wave, the pulse or burst of light will continually travel in fiber which is subjected to the same pressure from the same part of the wave 28. This pressure changes the geometric path length that the copropagating wave travels from A to B because each segment of fiber that the light wave travels in is equally stretched or compressed by the pressure effects from the traveling acoustic wave. The situation is not the same for the counterpropagating wave however. The counterpropagating light wave traveling from the B end to the A end first encounters segments of fiber that are compressed by the peaks 28 of the acoustic wave and then encounters fiber segments that are stretched by the troughs 30. The geometric path that the counterpropagating light wave travels is thus alternately made longer then shorter by the acoustic wave. If the length L, of the coil 24 is an integer multiple of the wavelength of the acoustic wave, the net path length change for the counterpropagating wave will be zero. The result is a net phase shift between the two counterpropagating light waves which is linearly proportional to the amplitude of the acoustic wave 26 and to the length, L, of the coil 24. That is for longer coil lengths, L, the acoustic wave has a greater interaction distance with the fiber in which the copropagating light wave is traveling. The total increase in path length, and the resulting phase shift, therefore increase with greater interaction length, L.

The greatest directivity or discrimination of the coil 24 results when the coil length, L, is chosen to be some integer multiple of the acoustic wavelength because the net phase shift is then zero for the counterpropagating wave, i.e., the wave which is travelling in the fiber in an axial direction opposite the direction of propagation of the acoustic wave, resulting in the best performance of the sensor. However, L, can be any non-neglible fraction of the wavelength of the acoustic wave which is sufficient to create a discernible relative phase shift between the counterpropagating waves which is indicative of the amplitude of the acoustic wave. The frequency for an acoustic wave of unknown frequency propagating with a known velocity could be determined by using a variable length delay line and tuning the line for zero phase shift in the counterpropagating wave.

The counterpropagating light waves in the loop 24 are produced by a light source 32 coupling light waves into a fiber 34 which guides the waves through a polarizer 36 to a fiber optic directional coupler 38 coupled to the two ends of the coil 24. The light source 32 can have a coherence length which is very short. That is, as long as the coherence length of the source exceeds the differential path length through the coil caused by the acoustic wave the two counterpropagating waves will still be coherent after travelling the length of the coil and they can be successfully merged to interfere with each other. The interference is necessary to be able to determine the amount of the relative phase shift.

The fiber 34 is, in the preferred embodiment, a monomode fiber.

The polarizer 36 is bidirectional and can be adjusted to pass only light of a predetermined polarization. The polarizer 36, is important in maintaining the reciprocal operational characteristic of the closed loop interferometer as is known in the art. The polarizer insures that the light going into the loop is in only one polarization. Any birefringence in the fiber of the loop will couple part of the energy to the orthogonal polarization mode where the propagation velocity is different from the velocity in the selected polarization. If the birefringence is not symmetric about the center of the geometric path, the counterpropagating waves will travel differing distances at the new velocities and will suffer different phase shifts. The polarizer only allows light of one polarization to enter the fiber and blocks all returning light energy in polarization modes other than the input polarization mode. Thus, the detector will only see light energy from the components of the counterpropagating waves which travelled through the loop in the selected polarization mode, and there will be no phase shift since both counterpropagating signals will have travelled the same geometric path length in the same polarization mode, i.e., at the same velocity.

The directional coupler 38 splits the polarized light wave travelling toward the loop from the polarizer 36 into two coherent light waves and couples each wave into one end of the coil 24, so that they counterpropagate. A beam splitter could be used in place of the directional coupler 38, but the directional coupler is the preferred embodiment since the fiber is continuous from the source 32 through the coupler and back to the detector. In contrast, a beam splitter joins separate fibers, the ends of which generate reflected waves. These reflected waves bounce back into the input fiber and interfere with the incoming light waves and can cause undesirable standing waves. The use of beam splitters is not a problem in terms of reflections where pulsed operation is used. In pulsed operation, the source 32 provides pulses separated by dark periods. By adjusting the length of fiber in the system and the pulse separation and duration, it is possible to cause the reflected signals to arrive at the detector during dark periods between the initial pulse and the returning combined pulse from the counterpropagating pulses.

The fiber optic coupler 38 also recombines the counterpropagating light signals after they have passed through the loop. The combine signal then is coupled into the input fiber 34 and passes through the polarizer 36 on its way to a photodetector 40. Between the polarizer 36 and the source 32, a second fiber optic directional coupler 42 is coupled to the input fiber 34.

This second coupler 42 diverts part of the energy from the combined signal returning from the loop 24 into the input of the photodetector 40. The photodetector then generates a signal proportional to the intensity of the combined signal which can be interpreted to determine the relative phase shift. This is known in the art.

In the preferred embodiment, a polarization controller 44 is placed in the loop 24 to control the polarization of light signals traveling in the loop. This is desirable to prevent "signal fading" caused by the interaction of the polarizer 36 with birefringence zones in the loop 24. For example, if the polarizer only allows vertically polarized light in and out of the loop, and birefringence in the loop couples all the energy from the counterpropagating light signals into the horizontal polarization mode, then the polarizer 36 would block all output light and the detector would register a zero output. The structure of polarization controllers is known in the art. These devices are capable of taking input light at one polarization and shifting it to output light at any other selected polarization.

By properly adjusting the polarization controller 44, it is possible to insure that at least some of the light, and preferably most of the light, exits the loop in the polarization passed by the polarizer 36. That is, the polarization controller can be used to maximize the output signal from the detector. This prevents environmentally caused birefringence and birefringence in the fiber structure caused by residual stress from manufacturing processes from causing signal fadeout. The time varying and spatially non-uniform effect of the acoustic wave on counterpropagating optical waves in coil 24 varies the intensity of the recombined optical wave which can then be detected as a measure of the amplitude of the acoustic wave.

Figure 3:
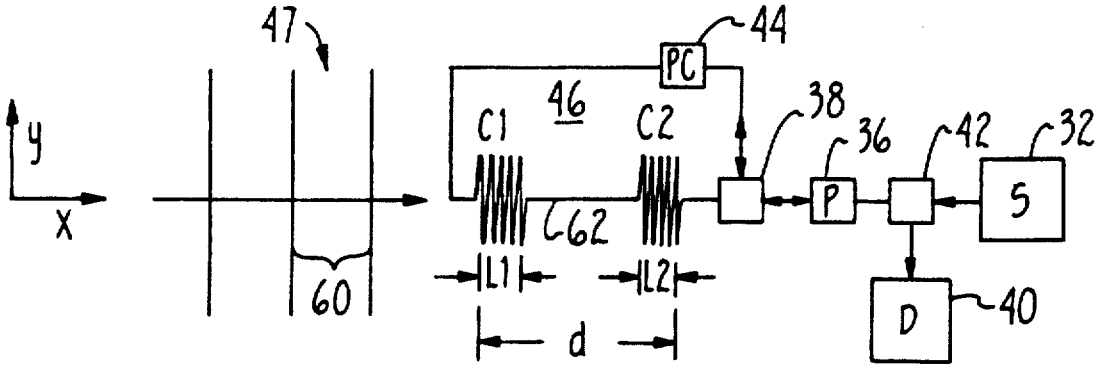
FIG. 3 is a schematic of an acoustic sensor employing a closed loop fiber optic interferometer in accordance with another embodiment of the invention.

One possible use for the embodiment described in FIGS. 2 and 3 is as a direction finder for acoustic waves. This can be done by turning the loop longitudinal axis until the output signal is a miximum.

Since the length of the coil is directly proportional to the amount of total phase shift in the co-propagating light, the sensitivity of the sensor can be increased by increasing L, especially in increments of the wavelength of the acoustic wave 26.

FIG. 3 is a schematic diagram of an acoustic sensor employing a closed loop interferometer in accordance with another embodiment of the invention. In this embodiment the coil 46 is separated into two separate spaced groups of coils designated by C1 and C2, one consisting of the first N/2 contiguous turns and the other consisting of the last N/2 contiguous turns of the optical fiber. The two groupings of coils are displaced along the x axis with respect to each other by a distance, d, such that the planes of the two groups of coils remain mutually parallel. The displacement, d, between the two groups of coils is chosen, in the preferred embodiment, to be an odd multiple of one quarter wavelength of the acoustic wave shown generally at 47. The total length of the fiber used to form the two groups of coils is such that the optical transit time through both coils is one-half the period of the acoustic wave frequency. In other embodiments, the distance d could be some other fraction of the wavelength of the acoustic wave if the sizes of the coils C1 and C2 are adjusted so that the optical transit times are the same fraction of the period of the acoustic wave that the distance d is to the wavelength of the acoustic wave. However, in these embodiments, the sensor is not as directionally selective. That is, in these alternative embodiments, the sensor will not discriminate as sharply between acoustic waves whose direction of propagation is parallel to the longitudinal axis x of the coils and acoustic waves whose direction of propagation is not parallel to the longitudinal axis of the coil.

The result of the foregoing structure is to cause a relative phase shift between counterpropagating light waves when an acoustic wave of the specified wavelength is propagating down the x axis. This phase shift is caused by the acoustic wave pressures acting on the counterpropagating light waves in a non-reciprocal fashion where such a wave would normally cause a reciprocal effect in an interferometer structure like the device of FIG. 1.

Figure 4:
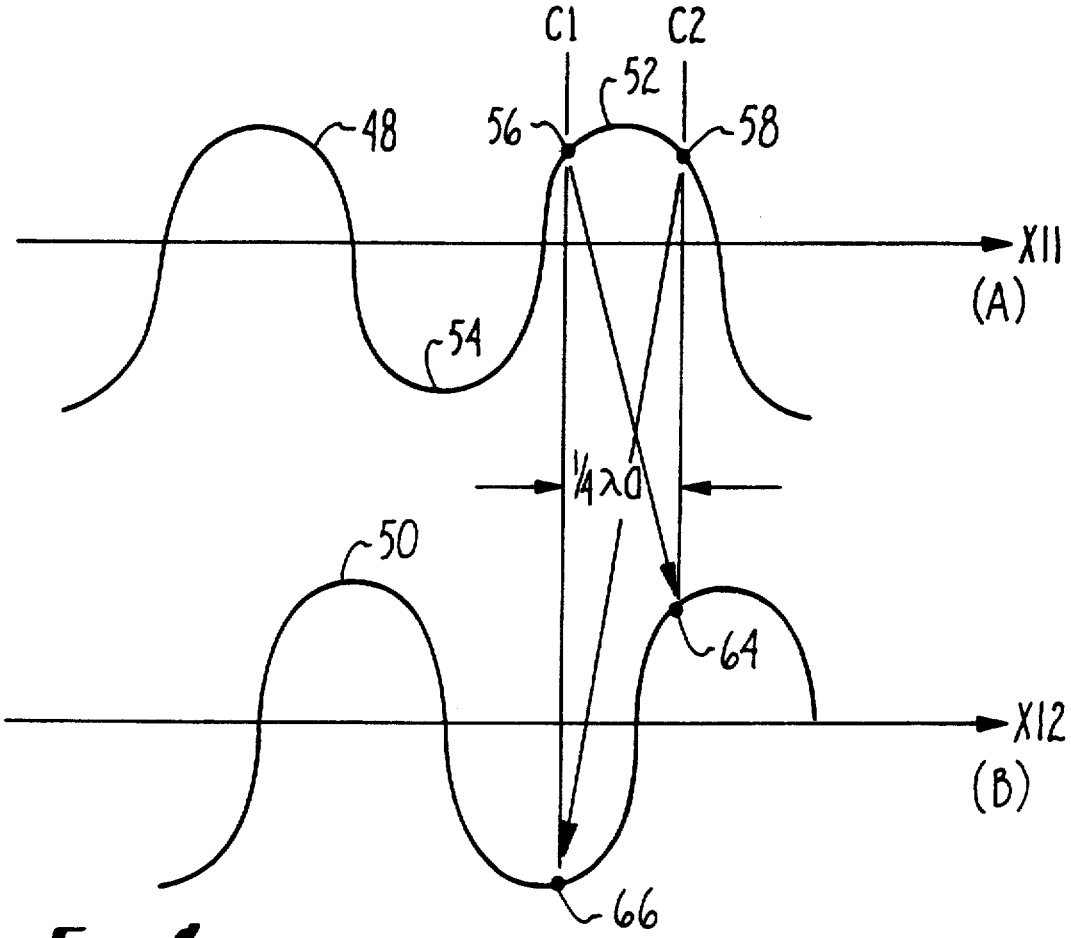
FIG. 4 is a plot of acoustic waves in the sensor of FIG. 3.

This non-reciprocal effect is illustrated in the plots of FIG. 4 showing the acoustic waves in the first set of coils C1 and in the second set of coils C2 at times t1 and t2. In the preferred embodiment the distance d between the two groups of coils is to be ¼ of the acoustic wave wavelength. The coils C1 and C2 are used such that the optical transit time therethrough is equal to ¼ of the period of the acoustic wave. The coils are also sized such that their lengths L1 and L2 are small compared to the wavelength of the acoustic wave. Again, as in the embodiment of FIG. 1, the coils have a longitudinal axis x which is arranged to be parallel to the axis of propagation of the acoustic wave for maximum sensitivity.

The curves 48 and 50 represent the acoustic wave separated by ¼th of the wavelength at the two instants in time t1 and t2 which instants in time are separated by ¼ of the period of the acoustic wave. That is, the curve 48 represents the situation at the time t1, i.e., it shows how the coils C1 and C2 are enveloped by the peaks and troughs of acoustic pressure at the time t1 where the peaks and troughs of pressure are represented by the areas 52 and 54 respectively. Likewise, the curve 50 shows how the coils C1 and C2 are enveloped by the acoustic wave at the point in time t2 ¼ period later. At the time t1, the coil C1 is experiencing a substantially uniform acoustic pressure throughout the coil at the pressure level indicated at 56. This results from the fact that the planes of the individual loops of the coil C1 are substantially parallel to the planes 60 of the acoustic wave 47 and from the fact that the length L1 of the coil C1 is small compared to the acoustic wavelength. The same observations are true for the coil C2 enveloped in the acoustic wave at the point 58 with the additional comment that the pressure at 58 is equal to the pressure at 56. This is because the coils C1 and C2 are separated by ¼ of the acoustic wavelength and the instant of time t1 happens to be a time when the wave peak is exactly centered between the coils. At some other later or earlier time, this would not be the case. The principal at work in the embodiment of FIG. 3 holds true for any time t however.

The positive compression effects acting uniformly throughout the coils C1 and C2, change the geometric path length uniformly in both the coils C1 and C2. The copropagating light signal in the coil C1 and the counterpropagating light signal in the coil C2 at the time t1 thus experiences equal changes in their geometric path lengths and, therefore, the transit time for each light signal through the whole loop is changed. Because the coils C1 and C2 are sized such that it takes each of the counterpropagating light signals ½ period of the acoustic wave to propagate through each coil, the copropagating light signal in C1 stays in the coil C1 until the time t2, at which time it exits on the fiber segment 62. An extremely short time later this co-propagating light signal enters the coil C2 which is immersed in the acoustic wave as shown at 64 on curve 50 in FIG. 4(B). Likewise, the counterpropagating wave in the coil C2 at the time t1 stays in C2 until the time t2 and then travels through the segment 62 and enters the coil C1. Thus, at the time t2, the coils C1 and C2 are immersed in acoustic pressure at the corresponding amplitudes as shown by points 64 and 66, respectively.

The co-propagating light signal which was in coil group C1 at time t1 and experienced the pressure at 56 in FIG. 4(A) is now in coil group C2 at time t2 and experiences the same positive compression effects from the acoustic wave 47 as shown at 64 in FIG. 4(B). These compressive effects change the geometric path length through the coil C2 in the same amount and in the same sign as occurred in the coil C1 at the time t1. Thus the transit time through the coil C2 is changed and is of the same sign as the change in transit time experienced in the coil C1 at the time t1. The overall change in transit time for the co-propagating signal is additive and nonzero therefore.

However, the counterpropagating light signal which was in coil group C2 at t1 experiences the pressure at 58 in FIG. 4(A) and then travels to the left and is in coil C1at time t2 where it experiences an equal and opposite pressure illustrated at 66 in FIG. 4(B). Thus, the counterpropagating light signal experiences a path length change in the coil C1 which is opposite to the path length change it experienced in the coil C2. Thus the change in transit time caused by the coil C2 is cancelled by the change in transit time caused by the coil C1, and the counterpropagating light signal will have a net change in transit time through the coil 46 of zero.

In summary, the effect on the wave propagating from coil C1 to C2 is reinforcing while the effect on the propagating from coil C2 to coil C1 is offsetting. Accordingly, the counterpropagating waves contain a relative phase difference when recombined after propagating through the two groups of coils. This phase difference is then detected and can be interpreted linearly to determine the amplitude of the acoustic wave.

If the optical transit time through each coil and the separation of the coils is other than ½ period and ¼ wavelength respectively, the sensor will still work to sense the presence of waves but the counterpropagating wave will not have a net zero transit time change. The response of the sensor in this case will be non-linear.

Both the sensors of FIGS. 2 and 3 have a certain bandwidth in which they are useful. The center frequency of each bandwidth is the frequency having the wavelength which causes a net zero phase shift in the counterpropagating light signal. At other wavelengths, the response falls off somewhat because of various effects.

In the embodiments of FIGS. 2 and 3, the optical coil interferometer also functions as the sensor for the measured acoustical wave. Further, both embodiments require that the coils be designed for a particular frequency of acoustic wave for optimal operation unless a variable coil length can be achieved such as by an infinitely variable delay line as is known in the art. The details of the structure of delay lines that could be used to give infinitely variable delays are given in an article entitled "Fibre-Optic Variable Delay Lines" published in Electronics Letters of Nov. 11, 1982, Vol. 18, No. 23, at pages 999-1000. Such variable delay lines could be used for the coil 24 in FIG. 2 or the coils C1 and C2 in FIG. 3 to change the center frequency of the sensor bandwidth.

Figure 5:
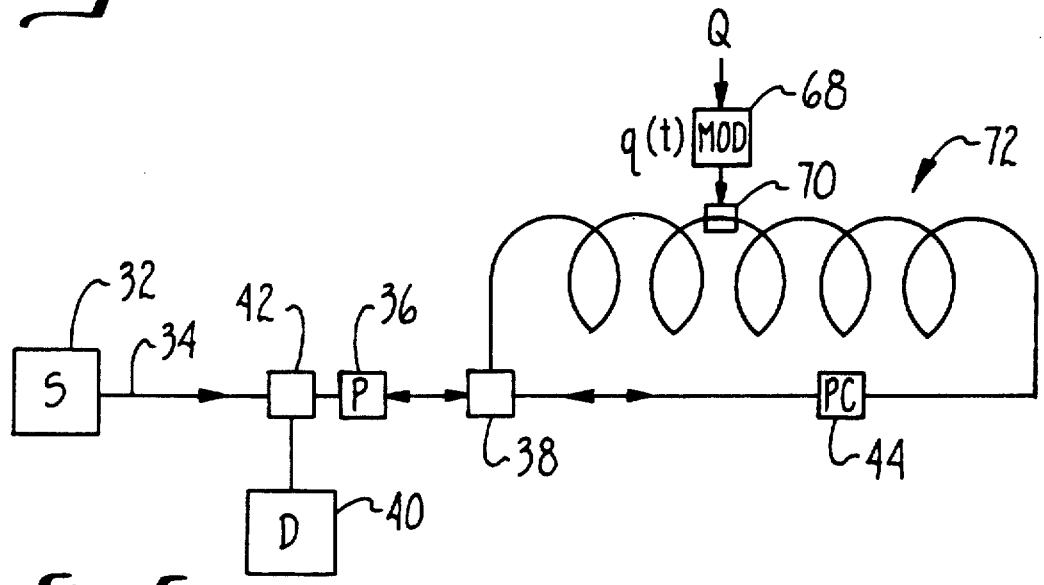
FIG. 5 is a schematic of a sensor which utilizes a closed loop fiber optic interferometer in accordance with the preferred embodiment of the invention.

FIG. 5 is a schematic diagram of another embodiment of a sensor which utilizes the optical coil solely as an interferometer and delay line. In this embodiment, the quantity to be sensed, designated as Q, is applied to a modulator 68 which generates a time varying signal, q(t) consisting of either a signal q(t) which varies directly with the sensed quantity Q or a carrier signal having a high frequency which is modulated by the quantity Q. Any suitable structure for the modulator 68 will suffice for purposes of the invention and the signal q(t) could be the quantity Q itself or an electrical signal proportional thereto.

The signal q(t) is applied to a transducer 70 which can be a polarization controller or any other device which can affect the optical transmission properties of the fiber at the location of the transducer 70. In the preferred embodiment, the signal q (t) is a carrier or bias frequency amplitude modulated with the quantity Q. In the preferred embodiment, the transducer 70 is a phase modulator. The transducer must be located at a spot that is offset from the geometric center on the geometric path of the loop. The signal q(t) must be time varying at a rate which is more rapid than the rate of change that is naturally filtered out by the structure and operation of closed loop fiber optic interferometers. The signal q(t) exerts a spatially non-uniform effect on the coil 72 as will be explained more fully below.

The structural details of the transducer 70 and the modulator 68 are not critical to the invention. The transducer 70 can be any device which can cause a change in the birefringence of the fiber at the location of the transducer 70 or elsewhere such as a device to put bending or other stress on the fiber in response to q (t). Further, the transducer 70 can be any device which can change the velocity of light propagating through the location of the transducer 70. Such a velocity modulating device could be any structure to convert q(t) to a physical change in the fiber transverse dimension at the location of the transducer. This changes the velocity of propagation of light signals through the region of changed transverse dimension by the waveguide effect. In another embodiment, the transducer 70 could be a polarization controller for changing the polarization of the counterpropagating light signals at the location of the transducer 70 in response to q(t).

In the preferred embodiment, the transducer 70 is a phase modulator which converts the signal q(t) to changes in the path length of the fiber optic waveguide at the location of the transducer 70 in the loop. That is, the fiber is stretched in the transducer 70 in accordance with the amplitude of the signal q(t). A suitable structure for such a phase modulator is a drum of piezoelectric material with the fiber of the coil 72 wound around the drum. A driving electrical signal such as the signal q(t) then is applied to the piezoelectric material and causes it to expand and contract radially in accordance with the magnitude of the driving signal. This radial expansion causes the fiber wrapped around the drum to be stretched.

In an alternative embodiment, the signal q(t) could be used to control the adjustment of a polarization controller as the transducer 70. The structural details of a polarization controller that might be adapted to perform such a function in all three embodiments are found in an article entitled "Single Mode Fibre Fractional Wave Devices and Polarization Controllers" by H.C. Lefevre published in Electronics Letters, Vol. 16, No. 20 and in U.S. patent application Ser. No. 183,975 filed Sept. 4, 1980.

The function and structural details of the source 32, the coupler 42, and detector 40, the polarizer 36, the fiber optic directional couplers 38 and 42 and the polarization controller 44 are the same in the embodiment of FIG. 5 as in the embodiments of FIGS. 2 and 3. Beam splitters could be used in the three embodiments but the reflections caused by these beam splitters would render pulsed operation more desirable as discussed above with reference to the embodiment of FIG. 2. Fiber optic directional couplers are the preferred embodiment in all three embodiments of the invention. The details of the structure and operation of the polarizer 36 are given in an article entitle "Single Mode Fiber Optic Polarizer" published in Optics Letters, Vol. 5, No. 11 at pp. 479–81 in November, 1980. The details of the structure and operation of the directional couplers 42 and 38 are given in an article entitled "Analysis of a Tunable Single Mode Optical Fiber Coupler" by Digonnet and Shaw published in the IEEE Journal of Quantum Electronics Vol. QE-18, No. 4, pp. 746–754 dated April, 1982. The details are also disclosed in U.S. patent application Ser. No. 300,955 filed on Sept. 10, 1981 which is a continuation in part of U.S. patent application Ser. No. 139,511 filed on Apr. 11, 1980.

The operation of the embodiment of FIG. 5 is as follows. The light source 32 supplies a light signal which is coupled into the single mode optical fiber 34 and guided through the directional coupler 42 and the polarizer 36 to the directional coupler 38. The polarizer 36 causes only light having a selected polarization to be passed through the polarizer regardless of whether the light is travelling toward the loop 72 or away from the loop 72. The directional coupler 38 splits the light signal into two coherent light signals counterpropagating around the loop and combines the returning counterpropagating light signals into one light signal travelling toward the source 32 in the fiber 34. The polarization controller 44 allows selection of the polarization for light travelling in the loop in either direction. The coupler 42 diverts part of the light travelling toward the source into the input of the photodetector 40 where it is converted to an electrical signal based upon its amplitude squared, i.e., its intensity. Of course the amplitude of the combined signals which have counterpropagated in the loop 72 depends upon the relative phase shift between these signals caused by the optical conditions in the loop. The counterpropagating light signals in the loop 72 have their relative phases shifted by the action of the transducer 70. The quantity Q can be either a rapidly changing quantity or a slowly changing quantity. If the quantity Q is rapidly changing, it can be applied directly to the transducer 70 which can convert it to a time varying shift in the path length of the fiber at the transducer 70 or a change in the birefringence of the fiber at the transducer 70.

If the transducer 70 changes the path length in the transducer 70 at a rapid, time varying rate, the counterpropagating light signals travel different path lengths through the loop and end up shifted in phase relative to each other. This is because they arrive at the transducer 70 at different times due to its off center location. Because the path length through the transducer 70 will be different at the two different times when the counterpropagating light signals arrive at the transducer, the two counterpropagating signals will have two different transit times through the loop 72. They will therefore arrive at the directional coupler 38 at different times and thus be shifted in phase relative to each other.

The combined signal will have an amplitude dependent upon the relative phase shift. The amplitude of the combined light signal can be interpreted to find the quantity Q because the relative phase shift is linearly related to Q.

If Q is a slowly varying differentially reciprocal quantity, such as temperature or pressure, Q will have to be modulated upon a rapidly time varying carrier signal applied asymmetrically because, as is well known in the art, closed loop fiber optic interferometers are ordinarily not sensitive to slowly time varying reciprocal effects. In fact, this is the great advantage of closed loop interferometers because this quality makes them very quiet and stable.

When Q is modulated onto a bias or carrier frequency such as by amplitude or frequency modulation, and the transducer 70 is a phase modulator, the above discussion still holds true. If amplitude modulation is used, the path length in the transducer will be changing sinusoidally at the bias or carrier frequency but the amplitude of the path length swings will vary with Q. Therefore the relative phase shift caused by the transducer 70 will vary sinusoidally. Further, the amplitude of the sinusoidal relative phase shift, i.e., the amplitude envelope of the sinusoidal swings in relative phase shift will be the quantity Q. The envelope will vary over time as Q varies over time.

If the transducer changes the birefringence of the fiber at the location of the transducer 70, the relative phase shift is caused by coupling of the light from one polarization mode to the other. Birefringence is the property of optical fibers which causes light propagating in them in different polarization modes to propagate at different velocities. If the transducer 70 is changing the birefringence of the fiber at the location of the transducer 70 in proportion to the signal q(t) or Q, the transducer will be changing the relative phase shift between the counterpropagating signals. This is because the transducer will be controlling the amount of energy travelling in the slow mode versus the amount of energy travelling in the fast mode. This is, when light travelling in a waveguide in one polarization mode encounters birefringence, some of the light energy will be coupled into the orthogonal polarization mode and will travel thereafter in the different velocity for the new polarization mode. If the amount of birefringence is a function of q(t), then the quantity Q can be determined by the amount of energy in the counterpropagating light signals propagating in the orthogonal polarization mode from the polarization established by the polarizer 36.

This can be determined from the amplitude of the combined signal from the counterpropagating signals in the orthogonal polarization mode. In the embodiment of FIG. 5 to determine the amplitude of the combined signal from the orthogonal mode, another directional coupler would have to be added between the polarizer and the coupler to direct some of the returning energy to a polarizer tuned to the orthogonal mode and another photodetector would have to be coupled to the output of the second polarizer.

The method of sensing acoustic or other waves comprises guiding counterpropagating light signals through a coil of a closed loop fiber optic interferometer which is wound and arranged in a predetermined way. That predetermined way is to arrange the coil so that the subject acoustic or other wave propagates down the longitudinal axis of the coil at the same rate that a co-propagating light wave progresses down the longitudinal axis of the coil. The phase difference is then detected between the counterpropagating light signals in the coil as the subject wave propagates through it.

More specifically the method comprises generating a light signal and polarizing the light signal in a selected polarization. The polarized light is then split into two light signals which are then counterpropagated through the helically coiled loop of a closed loop fiber optic interferometer which loop is arranged with its longitudinal axis parallel to the direction of propagation of the subject wave. The loop is coiled and sized such that the co-propagating light signal which travels through the fiber is substantially uniformly affected in terms of phase shift by the subject wave while the counterpropagating wave which travels through the fiber is not uniformly affected in terms of phase shift by the subject wave. The phase difference is then detected.

A method for sensing a phenomenon or quantity Q consists of guiding counterpropagating light signals through a coil of closed loop fiber optic interferometer. The quantity Q is sensed by a modulator which converts the quantity into a signal q(t) which varies with Q. The signal q(t) may be Q itself or an electrical signal varying linearly with Q in some applications. The signal q(t) is applied to the coil of the fiber optic interferometer at a location offset from the center of the geometric path of the coil such that the optical transmission characteristics of the fiber are altered at that location. The relative phase shift between the counterpropagating light signals is then detected.

The signal q(t) can be applied so as to alter the birefringence in proportion to q(t) at the location of application of q(t) or it can be applied so as to alter the velocity of propagation in the fiber in accord with q(t) at the location of application. Further q(t) can be applied such that the polarization of light passing through the location in the coil where q(t) is applied is altered proportionally to q (t). The preferred method is to alter the geometric path length of one counterpropagating signal relative to the other in accord with q(t).

All these methods should include the step of polarizing the light of the counterpropagating light signals in the same direction prior to entry into the coil and filtering out all returning counterpropagating light not of the same polarization as the polarization of the counterpropagating light signals coupled into the loop. This coupling should be done prior to detecting the relative phase shift between the returning counterpropagating light signals.

All these methods can also include the step of controlling and adjusting the polarization of the counterpropagating light signals in the loop to any selected polarization.

All the method of sensing the quantity Q can also include the step of modulating the quantity Q onto a bias or carrier frequency to generate a signal q(t) before applying q(t) to the loop.

The quantity could be applied directly to the transducer and the rate of change sensed. For example, the quantity Q may be temperature of an environment and the signal q(t) would be a time varying measure of the temperature. The signal q(t) is then applied asymmetrically to one or more small segments in the optical coil to affect the interferometer and thus generate a detectable variation in the recombined optical signals. In addition to the devices described above, the transducer 70 may also be electro-optical, piezoelectric, or magnetostrictive.

There has been described several embodiments of a sensor which either includes or utilizes a closed loop optical interferometer for detecting a sensed quantity Q. In each of the embodiments, the sensed quantity is spatially non-uniform with respect to the closed loop. The entire coil can be employed as the sensor element or the quantity can be applied at one or more points asymmetrically located on the coil.

Although the invention has been described in terms of a preferred embodiment, it will be apparent to those skilled in the art that numerous modifications can be made without departing from the spirit and scope of the claims appended hereto. Such modifications are intended to be included within the scope of the claims.

What is claimed is:

1. An apparatus for sensing, comprising:

an interferometer having a [coil of] *loop comprising an* optical [fiber] *waveguide* for propagating light, a light source for producing said light, and a coupling device for coupling said light to said [coil] *loop* to provide first and second counterpropagating light signals which propagate in opposite directions through said [coil] *loop* along an optical path formed by said [coil] *loop;* a detector for detecting the phase difference between said light signals after propagating through said [coil] *loop*, said detector providing an output signal;

a modulator for sensing a time varying quantity, Q, independently of said output signal, said modulator adapted to generate a carrier signal and modulate said carrier signal with said quantity Q, said modulator thereby transforming Q into a time varying signal q(t); and a transducer for receiving said time varying signal q(t) from said modulator and modulating the light propagating through said [coil] *loop* in accordance with the signal q(t), said transducer located at a location on said [coil] *loop* which causes said quantity Q to be applied asymmetrically to said loop such that the detected phase difference between said signals varies in response to the quantity Q.

2. An apparatus as defined in claim 1, wherein said transducer comprises a phase modulator.

3. An apparatus as defined in claim 2, wherein said transducer shifts the relative phase of said first and second light signals in response to q(t).

4. An apparatus as defined in claim 2, wherein said interferometer comprises a polarizer for causing said light source to couple light of a selected polarization into said [coil] *loop*.

5. An apparatus as defined in claim [1] *23*, wherein said transducer changes the birefringence of said fiber in response to q(t).

6. An apparatus as defined in claim 1 further comprising a polarizer for causing a lightwave of a selected polarization mode to propagate through said [coil] *loop*.

7. An apparatus as defined in claim 6 wherein said *optical waveguide comprises an optical fiber and wherein said* transducer changes the birefringence of said fiber in response to q(t), thereby causing coupling of a portion of said light wave to a polarization mode which is orthogonal to said selected polarization mode.

8. An apparatus as defined in claim 7 further comprising detector means for independently detecting light of said selected polarization mode and said orthogonal polarization mode.

9. An apparatus for sensing, comprising:

an interferometer having a coil of optical fiber for propagating light and a detector for detecting said light to provide an output signal;

a modulator for sensing a time varying quantity, Q, independently of said output signal, said modulator adapted to generate a carrier signal and modulate said carrier signal with said quantity Q, said modulator thereby transforming said quantity Q into a time varying signal q(t); and a transducer for receiving said time varying signal q(t) from said modulator and modulating the light propagating through said coil in accordance with the signal q(t), said signal q(t) varying in amplitude.

10. An apparatus for sensing, comprising:

an interferometer having a coil of optical fiber for propagating light, a light source for producing said light, and a coupling device for coupling said light to said coil to provide first and second counterpropagating light signals which propagate in opposite directions through said coil along an optical path formed by said coil;

a detector for detecting the phase difference between said light signals after propagating through said coil, said detector providing an output signal;

a modulator for sensing a time varying quantity, Q, independently of said output signal, said modulator adapted to generate a carrier signal and modulate said carrier signal with said quantity Q, said modulator thereby transforming Q into a time varying signal q(t); and a transducer for receiving said time varying signal q(t) from said modulator and modulating the light propagating through said coil] in accordance with the signal q(t), wherein said transducer comprises a phase modulator which causes phase modulation by stretching the optical fiber such that each of said first and second light signals travels a different optical path around said coil than each would travel in the absence of said signal q(t), said transducer located at a location on said coil which causes said quantity Q to be applied asymmetrically to said loop such that the detected phase difference between said signals varies in response to the quantity Q.

11. An apparatus for sensing, comprising:

an interferometer having a [coil of] *loop comprising an* optical [fiber] *waveguide* for propagating first and second light signals in opposite directions through said [coil] *loop* along an optical path formed by said light to provide an output signal;

a modulator for sensing a time varying quantity, Q, independently of said output signal, said modulator adapted to generate a carrier signal and modulate said carrier signal with said quantity Q, said modulator thereby transforming Q into a time varying signal q(t); and a transducer for receiving said time varying signal q(t) from said modulator and modulating the light propagating through said [coil] *loop* in accordance with the signal q(t), said transducer changing the velocity of propagation of said first and second light signals in response to q(t).

12. An apparatus for sensing, comprising:

an interferometer having a [coil of] *loop comprising an* optical [fiber] *waveguide* for propagating first and second light signals in opposite directions through said [coil] *loop* along an optical path formed by said [coil] *loop* and a detector for detecting said light to provide an output signal;

a modulator for sensing a time varying quantity, Q, independently of said output signal, said modulator adapted to generate a carrier signal and modulate said carrier signal with said quantity Q, said modulator thereby transforming Q into a time varying signal q(t); and a transducer for receiving said time varying signal q(t) from said modulator and modulating the light propagating through said [coil] *loop* in accordance with the signal q(t), said transducer shifting the relative phase of said first and second light signals in response to q(t).

13. A method of sensing a time varying quantity, Q, utilizing an [optical fiber] interferometer *having*, [comprised of] a loop [of] *comprising an* optical *waveguide* [fiber] which forms an optical path having an optical path length, a light source for producing light, a coupling device for splitting the light into two counterpropagating light signals which traverse said optical path in opposite directions, and a detector for detecting the phase difference between the signals after traversing the optical path length, said method comprising the steps of:

generating a signal q(t) in response to the time varying quantity Q by superimposing said quantity Q on a bias signal;

converting the signal q(t) to a corresponding change in the optical properties of the optical path at a location on said loop which is offset from the midpoint of said optical path length such that said phase difference varies in response to the quantity Q;

detecting said phase difference; and producing a signal indicative of said phase difference to sense a quantity Q.

14. An apparatus for sensing a time varying signal, Q, comprising:

[a fiber optic] *an* interferometer having a [closed] loop [of] *comprising an* optical *waveguide* [fiber] for propagating first and second light waves in opposite directions about said loop;

means for receiving said time varying signal, Q, and for modulating a bias signal in accordance with said signal, Q, to transform the signal Q into a time varying signal q(t);

means for altering optical transmission of said lightwaves propagating in said [fiber optic] loop in response to said signal q(t) to produce a phase difference between said first and second light waves; and means for detecting said phase difference between said first and second light waves caused by said altering means, said phase difference being indicative of said quantity Q.

15. An apparatus as defined in claim 14, wherein said means for receiving comprises a modulator.

16. An apparatus as defined in claim 14, wherein said means for altering comprises a transducer for receiving said time varying signal q(t) and for changing said optical transmission property of said [fiber] *waveguide* in accordance with said signal q(t).

17. An apparatus as defined in claim 16, wherein said transducer changes the birefringence of said [fiber] *waveguide* in response to said signal q(t).

18. An apparatus as defined in claim 16, wherein said transducer changes the velocity of propagation of light in the [fiber] *waveguide* in response to said signal q(t).

19. An apparatus as defined in claim 16, wherein said transducer changes the phase of light propagating in the [fiber] *waveguide* in response to said signal q(t).

20. An apparatus as defined in claim 16, wherein said transducer stretches the [fiber] *waveguide* in response to said signal q(t).

21. An apparatus as defined in claim 14, wherein said means for detecting comprises a detector which senses the amplitude of the combined said first and second counterpropagating light waves after propagation through said loop.

22. An apparatus for sensing a time varying quantity Q, comprising:

an interferometer having an optical fiber for forming an optical path for two counterpropagating light waves; and a modulator responsive to said quantity Q for modulating a bias signal in accordance with the same time varying quantity Q, said modulator connected to drive a transducer disposed at a location on said optical fiber which is offset from the center of said optical path, for locally altering the propagation characteristics in said optical path at said location to cause a phase shift between said waves, said phase shift being indicative of said quantity Q.

*23. An apparatus as defined in claim 1, wherein the optical waveguide comprises an optical fiber.*

*24. An apparatus for sensing, comprising:*

*an interferometer having a loop comprising an optical waveguide for propagating light and a detector for detecting said light to provide an output signal;*

*a modulator for sensing a time varying quantity, Q, independently of said output signal, said modulator adapted to generate a carrier signal and modulate said carrier signal with said quantity Q, said modulator thereby transforming said quantity Q into a time varying signal q(t); and*

*a transducer for receiving said time varying signal 20 q(t) from said modulator and modulating the light propagating through said loop in accordance with the signal q(t), said signal q(t) varying in amplitude.*

*25. An apparatus as defined in claim 14, wherein the optical waveguide comprises an optical fiber.*

*26. An apparatus for sensing a time varying quantity comprising:*

*an interferometer having an optical waveguide for forming an optical path for two counterpropagating light waves; and*

*a modulator responsive to said quantity for modulating a bias signal in accordance with the same time varying quantity, said modulator connected to drive a transducer disposed at a location on said optical waveguide which is offset from the center of said optical path, for locally altering the propagation characteristics in said optical path at said location to cause a phase shift between said waves, said phase shift being indicative of said quantity Q.*

* * * * *